Feb. 11, 1958 E. A. RAGLAND 2,823,344

DIRECTION-SENSING CODE MATCHING SYSTEM FOR BINARY CODES

Filed Oct. 2, 1953 2 Sheets-Sheet 1

FIG. 1

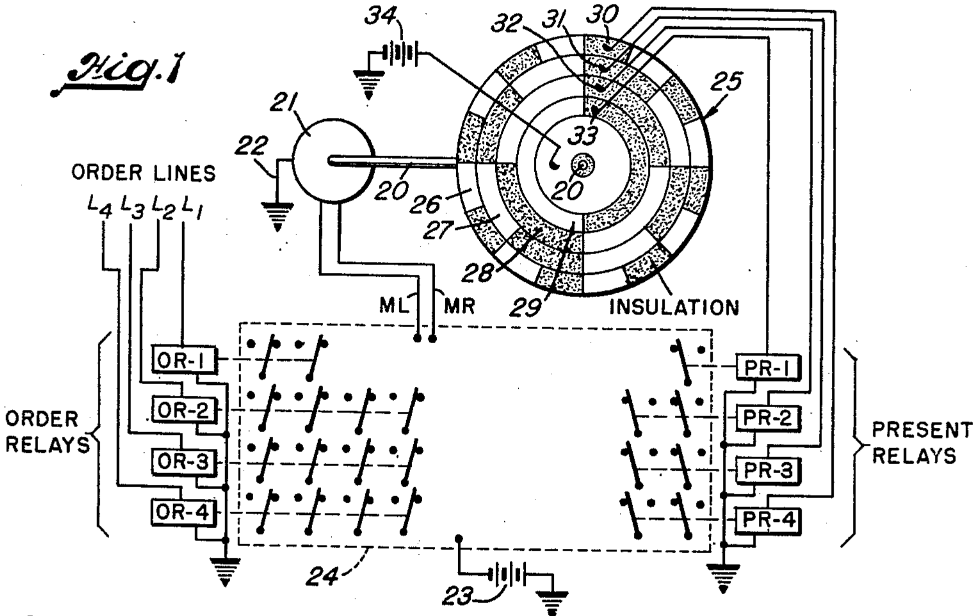

FIG. 3

| CODE | POSITION |
|---|---|
| 0000 | 1 |
| 0001 | 2 |
| 0010 | 3 |
| 0011 | 4 |
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 16 |

COMBINATIONS OF FIRST TWO DIGITS

| CONDITION | | PRESENT POSITION CODE | PRESENT POSITION QUADRANT | ORDERED POSITION CODE | ORDERED POSITION QUADRANT | SHORTEST PATH |
|---|---|---|---|---|---|---|
| I | 1 | 00 | $Q_1$ | 01 | $Q_2$ | RIGHT |
| | 2 | 01 | $Q_2$ | 10 | $Q_3$ | |
| | 3 | 10 | $Q_3$ | 11 | $Q_4$ | |
| | 4 | 11 | $Q_4$ | 00 | $Q_1$ | |
| II | 1 | 00 | $Q_1$ | 11 | $Q_4$ | LEFT |
| | 2 | 01 | $Q_2$ | 00 | $Q_1$ | |
| | 3 | 10 | $Q_3$ | 01 | $Q_2$ | |
| | 4 | 11 | $Q_4$ | 10 | $Q_3$ | |
| III | 1 | 00 | $Q_1$ | 00 | $Q_1$ | UNCERTAIN |
| | 2 | 01 | $Q_2$ | 01 | $Q_2$ | |
| | 3 | 10 | $Q_3$ | 10 | $Q_3$ | |
| | 4 | 11 | $Q_4$ | 11 | $Q_4$ | |
| IV | 1 | 00 | $Q_1$ | 10 | $Q_3$ | UNCERTAIN |
| | 2 | 01 | $Q_2$ | 11 | $Q_4$ | |
| | 3 | 10 | $Q_3$ | 00 | $Q_1$ | |
| | 4 | 11 | $Q_4$ | 01 | $Q_2$ | |

FIG. 5

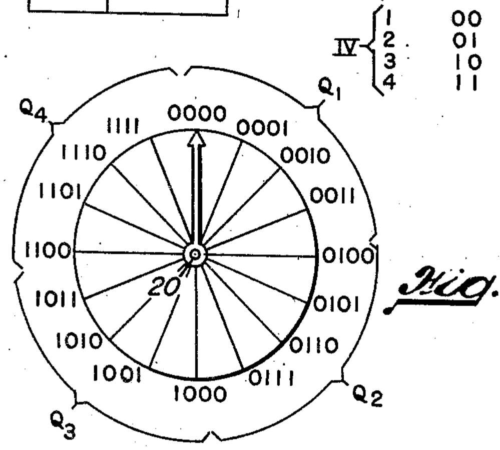

FIG. 4

INVENTOR.
E. A. Ragland
BY
[signature]
ATTORNEY

Feb. 11, 1958 E. A. RAGLAND 2,823,344

DIRECTION-SENSING CODE MATCHING SYSTEM FOR BINARY CODES

Filed Oct. 2, 1953 2 Sheets-Sheet 2

INVENTOR.
E. A. Ragland

BY

ATTORNEY

United States Patent Office 2,823,344

Patented Feb. 11, 1958

2,823,344

DIRECTION-SENSING CODE MATCHING SYSTEM FOR BINARY CODES

Earl Albert Ragland, Van Nuys, Calif., assignor to Bendix Aviation Corporation, North Hollywood, Calif., a corporation of Delaware Application October 2, 1953, Serial No. 383,863

2 Claims. (Cl. 318—467)

This invention relates to the determination of the relative values of two binary code numbers and to the position control of a movable member by digital binary code signals.

A broad object of the invention is to provide practicable systems for remote control of the position of a movable member by digital binary code signals.

Another object is to provide practicable systems for moving a member in an open-ended path directly from any position corresponding to one binary number into a new position corresponding to another binary number.

Another object is to provide a practicable system for moving a member in a closed (endless) path from any position corresponding to one natural binary code number in the direction of shorter path into a new position corresponding to another natural binary code number.

Other more specific objects and features of the invention will appear from the description to follow.

Briefly, the present invention resides in a system that is directly responsive to digital binary code "order" signals to move a controlled member directly into an ordered (new) position from a present or existing position.

Systems are presently known for moving a member always in the same direction into an ordered position, but such systems are limited in utility.

In accordance with the present invention, direct movement is provided by a circuit capable of deriving directional sense from comparison of a digital binary code corresponding to the ordered position with that corresponding to the present position, and selectively energizing a reversible motor in accordance therewith.

A full understanding of the invention may be had from the following detailed description with reference to the drawing, in which:

Fig. 1 is a schematic diagram of a general system in accordance with the invention.

Fig. 3 is a conventional table showing a 4-digit natural binary code identifying sixteen different values or positions.

Fig. 4 is an explanatory diagram illustrating the use of the code of Fig. 3 in a rotary positioning system.

Fig. 5 is a chart showing the significance of the first and second digits in the diagram of Fig. 4.

Figures 2, 2A:
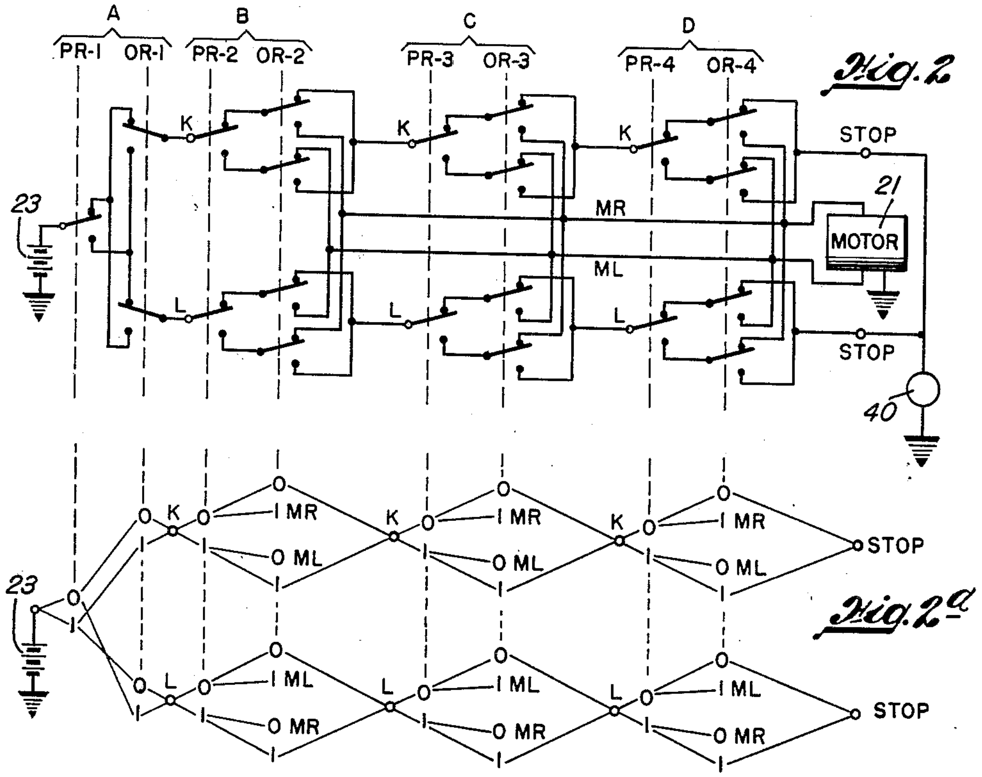
Fig. 2 is a schematic diagram of a circuit used in the system of Fig. 1.
Fig. 2*a* is an operational diagram explanatory of Fig. 2.

Referring to Fig. 1, there is shown a system for rotating a shaft 20 into any one of sixteen different positions in response to 4-digit natural binary code signals. The shaft 20 is rotated from one position to another by a reversible electric motor 21 which has a common ground return connection 22 and two input busses ML and MR respectively. Application of potential to the ML (motor left) bus causes the motor 21 to drive the shaft 20 to the left, or counterclockwise, and application of potential to the MR (motor right) bus causes the motor 21 to rotate the shaft 20 to the right, or clockwise.

For convenience, the directions of movement are termed right (clockwise) and left (counterclockwise). In the system shown, the numbers identifying different angular positions of the shaft 20 increase in clockwise direction and decrease in counterclockwise direction. As used herein, "right" or clockwise means the direction of increasing numbers, regardless of whether that direction is actually clockwise (as it appears to be in the system shown) or counterclockwise.

The buses ML and MR are selectively energized by connecting one or the other to one terminal of a potential source 23, the other terminal of which is grounded. The connection is effected by a circuit indicated in Fig. 1 by the reference numeral 24 and shown in the schematic circuit of Fig. 2. It will suffice at this point to explain that this circuit 24 includes the contacts of four present digital relays PR–1, PR–2, PR–3, PR–4 and of four order digital relays OR–1, OR–2, OR–3, and OR–4. As indicated in Fig. 1, one of these relays has one set of transfer contacts, others have two sets, and others have four sets.

The present relays PR–1 through PR–4 are energized in accordance with the position of the shaft 20 at any time. Thus, referring to Fig. 4, the circular arc of movement of the shaft 20 is divided into sixteen equally spaced angular positions, and a coding switch 25 (Fig. 1) on the shaft 20 is provided to selectively energize the four present relays in accordance with the codes indicated for the different angular positions in Fig. 4. The coding switch 25 has four zones 26, 27, 28 and 29, each containing dead and live segments associated respectively with four brushes 30, 31, 32 and 33, which are connected to the four present relays PR–1 to PR–4, inclusive. The live segments of the coding switch are connected to a source of potential 34, the other terminal of which is connected to the present relays through ground. It will be apparent that during rotation of the shaft 20 from one position to another, the present relays will be energized and de-energized in accordance with the code shown in Fig. 4.

The four order relays OR–1 to OR–4 are connected to separate order signal lines L–1 to L–4, over which order code signals are received. The apparatus for transmitting thse signals is not shown, but it will be understood that such a transmitter could comprise a transmitting shaft having a coding switch associated therewith similar to the coding switch 25.

The circuit 24 responds to the settings of the present and order relays to connect the source 23 to one or the other of the motor busses ML or MR whenever the position of any present relay differs from the position of the corresponding order relay to drive the shaft 20 from its present position to the ordered position, and to de-energize both of the busses ML and MR whenever all of the present relays occupy positions corresponding to the same numbered order relays. In other words, the overall function of the circuit 24 is to energize the motor 21 to move the shaft 20 into a position in which the code corresponding to the position of the shaft matches the order code, and stop it in that position.

The present system employs the most common binary code, commonly termed the "natural binary code," because each successive number in the code has a higher numerical value. This natural binary code is shown in Fig. 3. It will be noted that the last (rightmost) digit is the least significant since it changes most often, the second digit from the right is the next least significant digit, etc., each digit reversing in value half as often as does the next digit to the right. However, the present invention is not dependent on the order of arrangement of the digits of different significance. For convenience, the most significant digit will hereafter be referred to as the first digit, and the next most significant digit as the second digit, etc., with the understanding that the terminology relates to the general significance of the different digits and not necessarily to their relative positions in the code.

An important feature of the embodiment of the invention incorporating the circuit of Fig. 2 is that it provides a system using the natural binary code which has directional sense, whereby the controlled member 20 is automatically always moved in the direction of the shorter path to its ordered position.

Referring to Fig. 4, it will be observed that when the code of Fig. 3 is applied to a circle, the first digit in all positions in the first and second quadrants $Q_1$ and $Q_2$ is "0," and the first digit in all positions in the third and fourth quadrants $Q_3$ and $Q_4$ is "1." It will be apparent, therefore, that, since the shorter path from any point in the semi-circle defined by quadrants $Q_1$ and $Q_2$ to any point in the other half of the circle containing quadrants $Q_3$ and $Q_4$ is sometimes clockwise and sometimes counterclockwise, the first digit alone cannot provide directional sense. However, it will be noted that the combination of the first two digits in any quadrant is different from the combination of the first two digits in any other quadrant. Therefore, the first two digits in combination give some directional sense. For example, if the present position is in quadrant $Q_1$ and the ordered position is in quadrant $Q_4$, the shorter path is in counterclockwise direction, and if the ordered position is in quadrant $Q_2$ the shorter path is in clockwise direction. On the other hand, if the ordered position is either in the same quadrant as the present position or in the opposite quadrant, the shorter path may be either clockwise or counterclockwise, depending upon the positions of the present and ordered numbers within their respective quadrants. The positions within the quadrants are determined by the digits following the first and second digits.

The circuit of Fig. 2 responds to all possible combinations of present and ordered codes to move the shaft in the direction of shorter path from the present position into the ordered position. An understanding of its operation is facilitated by the chart of Fig. 5.

As shown in Fig. 5, when the present and ordered positions are in adjacent quadrants the direction of movement is obvious from the first two digits (conditions I and II). However, when the present and ordered positions are in the same quadrant (condition III) or in opposite quadrants (condition IV), the first two digits cannot determine the direction of movement. The eight unknown conditions are divided into the two groups III and IV, because for the same third and fourth digits the shorter path will be in a different direction when the present and ordered positions are in the same quadrant than when they are in opposite quadrants.

Referring back to Fig. 4, it will be observed that for diametrically opposite positions all digits following the first digit are identical. Hence, it is the first digit alone that determines in which of two opposite quadrants a position is located.

It will be apparent from Fig. 4 that if the last three digits of the order number are higher in value than those of the present position, the shorter path will be to the right if both positions are in the same quadrant, but to the left if they are in opposite quadrants. Hence the system must respond differently to the last three digits when the first digits of the present and order numbers match than when they mismatch.

Referring to Figs. 2 and 2*a*, if the present and order codes are in the same quadrant (condition III), the present and order first digits match, and the contacts of the relays PR–1 and OR–1 in the first section A of the circuit connect the current source 23 to one input line K of the section B of the circuit. On the other hand, if the present and order codes are in opposite quadrants (condition IV), the present and order first digits mismatch, and the contacts of relays PR–1 and OR–1 connect the current source 23 to another input line L of the second section B.

As will be apparent from Figs. 4 and 5, if the second digits match (condition III or IV), they cannot determine direction, because such matching indicates that the present and ordered positions are either in the same or opposite quadrants, and the direction of shortest path then depends on the relative locations of the present and ordered positions within the quadrant or quadrants. Hence in the circuit 24 of Fig. 1, as shown in Fig. 2, the contacts of relays PR–2 and OR–2 in Section B connect the input lines K and L of that section to the corresponding input lines K and L, respectively, of the next section C.

However, if the second digits of the present and order codes mismatch, they do determine the direction of shorter path, and it is to the right if the first digits match and the second present and order digits are "0," "1," respectively, or to the left if the first digits mismatch and the second present and order digits are "1," "0" respectively.

In Fig. 2, when the first digits match, only input line K of Section B is energized, and it is connected by the contacts of relay PR–2 and OR–2 to the MR bus when the second present and order digits are "0," "1," respectively, and to the ML bus when the second present and order digits are "1," "0" respectively.

On the other hand, when the first digits mismatch, only line L of Section B is energized, and it is connected by the contacts of relays PR–2 and OR–2 to the ML bus when the second present and order digits are "0," "1," respectively, and to the MR bus when the second present and order digits are "1," "0," respectively.

It will be observed from Fig. 2 that sections B, C and D are identical, and regardless of the number of digits in the code, all sections except the first section will be identical, each being responsive to its associated present and order relays.

In Fig. 2, the movable contact of each set of transfer contacts is shown in the position it assumes when its corresponding digit is "0." Hence, the circuit is in the condition of rest when both the present and ordered position numbers are "0000." When any digit is "1" the associated movable contacts are in the position opposite that shown.

The circuit consists essentially of a plurality of pairs of contact sets, each of which pairs compares a digit of the present code with the corresponding digit of the ordered code and completes different current paths, depending upon a match or mismatch between the compared digits. Thus one set of transfer contacts of relay PR–1 is paired with two sets of transfer contacts of relay OR–1 to complete a circuit from the source 23 to the input line K when the digits match, irrespective of whether both digits are "0" or whether both digits are "1," and complete a circuit to line L whenever the first present digit mismatches the first order digit, irrespective of the order of the mismatch.

In each half of each of the sections B, C and D, one set of transfer contacts on the PR relay is paired with two sets of transfer contacts on the corresponding OR relay to complete a connection from the input terminal K of that section to the input terminal K of the next section whenever the compared digits match, irrespective of their value, and to connect the input terminal K to the MR bus when the associated present and order digits mismatch in the order "0," "1," and to the ML bus when they mismatch in the order "1," "0."

In the diagram of Fig. 2*a*, the operation of the circuit of Fig. 2 is shown by lines connected by the digit symbols instead of by the relay contacts controlled by those digit symbols. Thus, if the first present digit is "0," the source 23 is connected to the input line K of Section B only if the present digit is "0" and the order digit is "0," or if the present digit is "1" and the order digit is "1"; and the source is connected to terminal L of Section B only if the first present digit is "0" and the first order digit is "1" or the first present digit is "1" and the first order digit is "0."

An important advantage of the invention is that the circuit does not become disproportionately complex as the number of digits in the codes increases. For each additional digit it is merely necessary to add another intermediate section identical with sections B, C and D. The number of contacts on each relay remains the same. On the other hand, each additional digit in the codes doubles the number of positions and the accuracy of control. Five digits provide 32 positions; six digits provide 64 positions; and nine digits provide 512 positions, enabling positive angular positioning to substantially less than 1° of angular shaft movement.

The circuit heretofore discussed is adapted for use with a member movable in a closed or endless path and has the important advantage of moving the member in the direction of shorter path from the present to the ordered position.

However, there are situations in which the movable member has an open-ended path and can move in only one direction from the present to the ordered position. This is generally the case with linear and arcuate indicators and is sometimes the case with full circle indicators. Thus, referring to Fig. 4, it may be desirable in some instances to always rotate the shaft to the right (clockwise) when moving from a lower to a higher number, and to the left when moving from a higher to a lower number, even though this involves taking a longer path. Such movement can be produced with the circuit of Fig. 6, the operation of which is shown in Fig. 6*a*.

Figures 6, 6A:
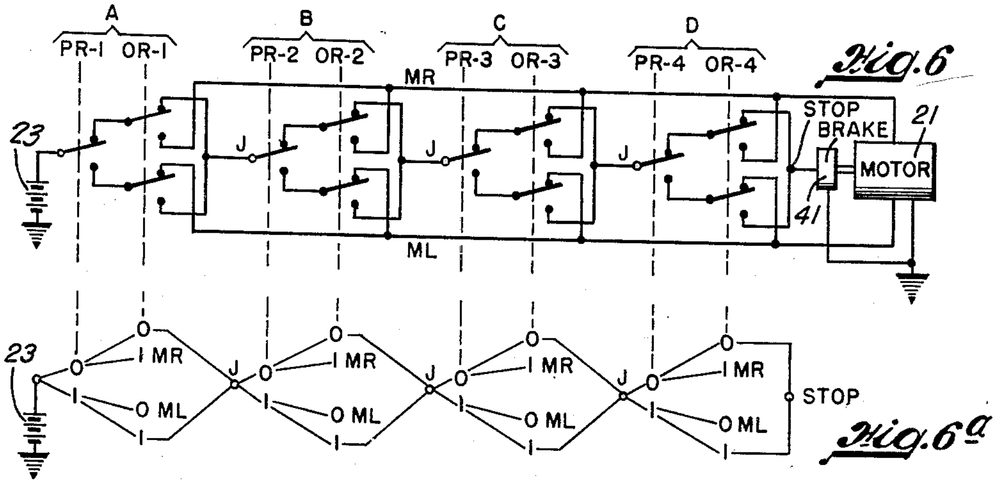
Fig. 6 is a schematic diagram of an alternative circuit substitutable for the circuit of Fig. 2 to give a different mode of operation.
Fig. 6*a* is an operational diagram explanatory of Fig. 6.

The circuit of Fig. 6 is much simpler than the circuit of Fig. 2, because the first digits alone can determine the direction of movement to a higher or lower number when they are mismatched. In this system, all of the circuit sections A, B, C and D are identical, each responding to its associated present and ordered digits to complete a circuit to the MR or the ML bus when the digits mismatch and completing a circuit to the next succeeding section when the digits match. Fig. 6 differs further from Fig. 2 in that it has only one line J between successive circuit sections, whereas in Fig. 2 each section is connected to one or the other of two lines K and L leading to the next section, depending upon the direction of mismatch.

Considering in detail the operation of Fig. 6 as shown in Fig. 6*a*, the contacts of the present and order relays PR–1 and OR–1 connect the source 23 to the input line J of section B whenever the first digits match, irrespective of whether they are both "0," "0" or "1," "1." Such operation occurs, of course, when the present and ordered positions are in opposite halves of the path of movement, whether this path is linear as in Fig. 3 or circular as in Fig. 4. This is apparent from the fact that if the first digits are the same, both positions are in the same half of the path, and their relative positions in that half cannot be determined by the first digits.

However, if the first digits mismatch and the present digit is "0" and the order digit "1," the direction of movement is to the right in Fig. 4 or down in Fig. 3, hence the contacts of relays PR–1 and OR–1 connect the source 23 to the MR bus if the ordered position is higher than the present position, and to the ML bus if the ordered position is lower in value than the present position.

If the first digits mismatch, section A produces movement of the present position until it is in the same half of the path as the ordered position, whereupon it deenergizes the bus and energizes the line J to section B. If the present and ordered positions are in the same quadrant, the second digits will match, and the circuit will be completed onto line J of section C. On the other hand, if the present position is now in a different quadrant than the order position, section B will energize the appropriate bus to continue the movement into the same quadrant as the ordered position. This operation continues from section to section until the present position becomes the ordered position and all circuits from the source 23 to the MR and ML busses are open.

Whereas the circuit of Fig. 2 determines the direction of shorter distance between two positions arranged in a closed or endless path, the circuit of Fig. 6 has as a broad function the comparison of the present and ordered codes for determining which has the higher value, since the direction of movement is always to the right in Fig. 4 or down in Fig. 3 when moving to a higher number, and always to the left in Fig. 4 and up in Fig. 3 when moving to a lower number.

The circuit of Fig. 6, instead of being employed to drive a motor in one direction or another, could be employed to energize an indicator that would merely indicate whether the ordered number is higher or lower than the present number. It will also be apparent that since in Fig. 6 the motor rotates a distance corresponding to the difference in value between the present and ordered numbers, measurement of the movement of the motor can be utilized to give the difference between the present and ordered numbers.

As shown in Figs. 2 and 6, output terminals labeled "Stop" are provided on the last section D, and these terminals are always energized when the desired movement has been completed and the present position becomes the same as the ordered position. These "Stop" terminals may be utilized to energize any desired device, such as an indicator lamp 40 in Fig. 2 or a brake 41 in Fig. 6, to effect rapid and positive stopping of the shaft 20 at the completion of its movement. Alternatively, the stop terminal and the switch contacts connected thereto may be omitted if no operation is to be performed in response to completion of the movement.

Although for the purpose of explaining the invention, a particular embodiment thereof has been shown and described, obvious modifications will occur to a person skilled in the art, and I do not desire to be limited to the exact details shown and described.

I claim:

1. In a digital control system, a controlled member movable in either direction in a closed path through a plurality of positions corresponding to successive multidigit binary code numbers; a reversible driving mechanism coupled to said member and having MR and ML busses and responsive to potential on its MR bus to move said member in direction of increasing numbers and responsive to potential on its ML bus to move said member in direction of decreasing numbers; means responsive to movement of said member for developing present binary code signals corresponding to the position of said member at any instant; means for receiving order binary code signals corresponding to ordered positions of said member; and selective energizing means directly responsive to different present and order signals for energizing that one of said MR and ML busses to move said member in the direction of shortest path to the order position from the present position, said energizing means comprising a plurality of tandem digit-comparing circuit sections, each section responsive to corresponding digits of the present and order signals, including a first section responsive to the first digits and having first and second output lines and a plurality of main sections successively associated with and responsive to successive single digits following the first digit, each main section having first input and output lines and second input and output lines, and the input lines of each section being connected to the corresponding output lines of the preceding section; said first section comprising means for comparing said first present and order digits and energizing its first output line when said digits match, and energizing its second output line when they mismatch; each main section containing means for comparing its associated present and order digits and connecting its first input line to said MR bus and its second input line to the ML bus when its associated digits mismatch in one sense, and connecting its first input line to the ML bus and its second input line to the MR bus when its associated digits mismatch in the other sense; and each main section except the last comprising means for connecting each of its input lines to its corresponding output line when said digits match.

2. A system in accordance with claim 1 in which each of said main sections comprises two separate circuits, one associated with the first input and output lines and the other associated with the second input and output lines of that section, each of said circuits comprising a first stage transfer switch responsive to one associated digit and two second stage transfer switches responsive to the other associated digit, said first stage switch connecting the associated input line to one second stage switch when one digit is "0" and to the other second stage switch when the digit is "1," said one second stage switch making connection to the associated output line when the other digit is "0" and to one bus when said other digit is "1," said other switch making connection to the other bus when the other digit is "0" and to the associated output line when the other digit is "1."

References Cited in the file of this patent

UNITED STATES PATENTS

| | | |
|---|---|---|
| 2,318,591 | Couffignal | May 11, 1943 |
| 2,575,342 | Gridley | Nov. 20, 1951 |
| 2,590,110 | Lippel | Mar. 25, 1952 |
| 2,630,552 | Johnson | Mar. 3, 1953 |
| 2,630,562 | Johnson | Mar. 3, 1953 |